(12) United States Patent
Ligneul et al.

(10) Patent No.: US 7,148,693 B2
(45) Date of Patent: Dec. 12, 2006

(54) PROCESS AND DEVICE FOR PROSPECTING A POROUS GEOLOGICAL FORMATION

(75) Inventors: Patrice Ligneul, Chaville (FR); Marwan Charara, Rueil Malmaison (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/504,799

(22) PCT Filed: Feb. 7, 2003

(86) PCT No.: PCT/EP03/50012

§ 371 (c)(1),
(2), (4) Date: Apr. 15, 2005

(87) PCT Pub. No.: WO03/073134

PCT Pub. Date: Sep. 4, 2003

(65) Prior Publication Data

US 2005/0174119 A1     Aug. 11, 2005

(30) Foreign Application Priority Data

Feb. 28, 2002   (FR) ................................. 02 02543

(51) Int. Cl.
*G01V 3/00* (2006.01)
(52) U.S. Cl. ...................... 324/355; 324/333
(58) Field of Classification Search ................ 324/348, 324/358, 333, 355
See application file for complete search history.

(56) References Cited

U.S. PATENT DOCUMENTS

| | | | |
|---|---|---|---|
| 3,599,084 A | 8/1971 | Bkamjian | |
| 3,896,413 A | 7/1975 | Boyd et al. | |
| 4,583,046 A * | 4/1986 | Vinegar et al. | 324/373 |
| 4,658,215 A * | 4/1987 | Vinegar et al. | 324/366 |
| 5,055,788 A * | 10/1991 | Kleinberg et al. | 324/303 |
| 5,594,343 A * | 1/1997 | Clark et al. | 324/338 |
| 5,644,231 A * | 7/1997 | Wignall | 324/303 |
| 5,841,280 A * | 11/1998 | Yu et al. | 324/323 |
| 6,614,229 B1 * | 9/2003 | Clark et al. | 324/338 |
| 2002/0105332 A1 * | 8/2002 | Rosthal et al. | 324/338 |
| 2002/0186013 A1 * | 12/2002 | Tabarovsky et al. | 324/343 |

FOREIGN PATENT DOCUMENTS

| | | |
|---|---|---|
| EP | 0512756 A | 11/1992 |
| WO | WO 8601003 A | 2/1986 |

* cited by examiner

*Primary Examiner*—Edward Lefkowitz
*Assistant Examiner*—David M. Schindler
(74) *Attorney, Agent, or Firm*—Bryan L. White; Brigitte L. Echols

(57) ABSTRACT

A porous geological formation contains electrolytic fluid. During the geophysical prospecting of the formation, a region of interest of the formation where the electrolytic fluid is found is stimulated with an excitation signal. The excitation signal corresponds to an energy of a first type. The excitation signal is converted in the region of interest into a response signal. The response signal corresponds to an energy of a second type. The response signal is detected. An electric polarisation is applied to the region of interest so as to strengthen the response signal relative to what it would be in the absence of polarisation. The electric polarisation comes about by means of a continuous or quasi-continuous polarising electric field. The polarising electric field is modulated in frequency with a frequency which is low relatively to the excitation frequency.

13 Claims, 4 Drawing Sheets

PROCESS AND DEVICE FOR PROSPECTING A POROUS GEOLOGICAL FORMATION

TECHNICAL FIELD

The present invention relates to the geophysical prospecting of a porous geological formation, using one of the following effects: the electrokinetic coupling effect or the electro-osmotic coupling effect which is the reciprocal effect.

In the oil prospecting field, measurements are taken in situ in geological formations to evaluate particularly the mobility of the fluids they contain and to deduce their permeability, their porosity, the presence of many fluids, the location or the properties of the fluid or fluids.

It is known that deposits of hydrocarbons do not all have the same qualities or the same quantities of production. Their quality depends particularly on the quantity of hydrocarbons they contain but also on the permeability of the rock medium in which the hydrocarbon is trapped, in other words on the ease with which the hydrocarbon is able to flow to the extraction well.

It is of the greatest importance to carry out such geophysical prospecting in order to evaluate the properties of the subsoil at deposit level before making any decision on exploitation or to estimate the reserves.

PRIOR ART

Currently used measurement processes are based on electrokinetic or electro-osmotic coupling effects. These coupling effects may be explained in the following way.

In a solid medium, ions of a first type belonging to the medium tend to be concentrated on the surface even if the medium is overall electrically neutral. There is a natural surface charge. This is generally a negative charge for clayey rocks. For others it is the reverse.

In a porous geological formation, in other words with solid rock parts mixed with porous spaces, containing at least one electrolytic fluid, the fluid ions, being of a second type contrasting with the first type, are attracted by the surface of the rock parts and electrochemical connections or dipoles are formed at the rock-fluid interface. The electrochemical potential at the interface is called Zeta $\zeta$ potential, it characterises the rock-fluid surface, and its value is roughly a few tens of millivolts. The fluid ions therefore separate with the ions of the other fluid type remaining in the pores.

The electrolytic fluid may be water, salt or fresh, a hydrocarbon such as oil or gas but more generally, it is a mixture of water and hydrocarbon.

When a mechanical excitation signal such as an acoustic wave is applied in the porous geological formation, it generates a relative movement between the fluid and the geological formation, the effect of which is to modify or break the electrochemical connections, to create a density of electric current and to induce an electromagnetic field which is able to be measured. This phenomenon is principally sensitive at an impedance break interface, for example at the interface between rocks of different kinds, at the interface between zones of different porosity, at the interface between two fluids of different kinds since the discontinuities reflect a part of the acoustic waves. Another part of these acoustic waves is transmitted beyond the discontinuity. The layer of fluid ions at the surface of the rock parts acts as a resilient layer which may be compared, in a colourful way, with the membrane of a drum.

There is therefore a conversion between an applied mechanical energy, generally in the form of an applied pressure, and a detected electromagnetic energy, generally in the form of electric voltage. A coupling coefficient is defined in relation to electrokinetic conversion which connects the induced and measured electromagnetic field to the applied movement. This coupling coefficient $K_s$, the order of magnitude of which is a few nV/Pa when measurements are taken on laboratory samples (see table below), is expressed by the following relationship:

$$K_s = V/P = \epsilon \zeta / 4\pi\mu\sigma$$

where V is the measured voltage, P the applied pressure, $\epsilon$ is the fluid dielectric constant, $\zeta$ the Zeta potential characterising the solid-fluid surface, $\mu$ the fluid viscosity and $\sigma$ the fluid conductivity.

From this coefficient, it is in particular possible to deduce the mobility of the fluid in the geological formation by comparison with graphs or by using an appropriately programmed computer.

The European patent EP-B1-0 043 768 in the name of the applicant uses this principle in order to determine the permeability of a terrestrial formation from measuring the flow potential created by a repetitive mechanical excitation of the formation.

The French patent FR-A1-2 716 536 also uses this principle in order to measure the permeability of a fluid filled rock medium from a magnetic field measurement taken by at least one magnetometer or a coil, this magnetic field being induced by causing a relative movement to be transmitted between the fluid and the rock medium through the injection of an auxiliary fluid under pressure.

Conversely when an excitation signal in the form of an electromagnetic energy is made to interact with the porous geological formation, the polarisation of the fluid in the pores is modified, which induces seismic micro-movements in the geological formation and more particularly at an impedance break interface. These induced movements are detectable by any appropriate means for example one or more geophones, hydrophones, accelerometers, etc. There is therefore a conversion between an applied electromagnetic energy and a detected mechanical energy. A coupling coefficient is defined in relation to electro-osmotic conversion which connects the measured pressure to the electromagnetic field generally applied in the form of a difference in potential between two electrodes. This coupling coefficient $K_E$, of which the order of magnitude is a few Pa/V or a few tens of Pa/V when measurements are taken on laboratory samples (see table below), is expressed by the following relationship:

$$K_E = P/V = 2\epsilon\zeta/\pi R^2$$

where P is the measured pressure, V the applied difference in potential, $\epsilon$ the fluid dielectric constant, $\zeta$ the Zeta potential characterising the solid-fluid surface, R the average radius of the pores of the geological formation.

From this coefficient, as previously, it is in particular possible to deduce the mobility of the fluid in the geological formation by comparison with graphs or by using an appropriately programmed computer.

Orders of magnitude of the electrokinetic ($K_E$) and electro-osmotic ($K_E$) coupling coefficients, of the permeabilities ($K_d$) measured on samples, of the Zeta potential $\zeta$ and of the average radius R of the pores for different rock samples are collected together in the following table

| Sample | $K_s$ nV/Pa | $K_E$ Pa/V | $K_d$ mdarcy | $\zeta$ mV | R μm |
|---|---|---|---|---|---|
| Fontainebleau-A Sandstone | 5.48 ± 0.63 | 0.334 ± 0.069 | 2240 ± 39 | −13.9 ± 2.5 | 15.4 ± 4.7 |
| Fontainebleau-B | 7.42 ± 0.38 | 0.620 ± 0.021 | 989 ± 187 | −18.8 ± 2.8 | 13.1 ± 2.8 |
| Fontainebleau-C | 7.36 ± 0.60 | 21.9 ± 0.3 | 5.9 ± 1.6 | −18.7 ± 3.0 | 2.20 ± 0.48 |
| Berea-A | 9.47 ± 0.06 | 2.25 ± 0.10 | 684 ± 120 | −24.1 ± 3.3 | 7.78 ± 1.6 |
| Berea-B | 8.44 ± 0.27 | 23.8 ± 0.20 | 39.2 ± 7.5 | −21.4 ± 3.1 | 2.26 ± 0.47 |
| Bandera | 7.54 ± 0.26 | 684 ± 45 | 1.43 ± 0.25 | −19.2 ± 2.7 | 0.40 ± 0.09 |
| Whitestone Limestone | 2.67 ± 0.28 | 28.2 ± 0.53 | 6.40 ± 1.7 | −6.77 ± 1.2 | 1.17 ± 0.29 |
| Indiana | 4.82 ± 0.16 | 48.3 ± 3.7 | 5.13 ± 0.89 | −12.3 ± 1.7 | 1.20 ± 0.26 |
| Molten glass balls | | | | | |
| 50-μm A | 7.54 ± 0.41 | 27.2 ± 0.82 | 8.09 ± 1.4 | −19.1 ± 2.9 | 2.00 ± 0.42 |
| 50-μm B | 8.49 ± 0.63 | 14.3 ± 0.47 | 69.3 ± 12 | −21.6 ± 3.4 | 2.92 ± 0.63 |
| 100 μm | 7.90 ± 0.75 | 1.87 ± 0.33 | 602 ± 105 | −20.1 ± 3.4 | 7.79 ± 2.2 |
| 200 μm | 4.88 ± 0.39 | 0.159 ± 0.026 | 4439 ± 1400 | −12.4 ± 2.0 | 21.0 ± 9.7 |

The patent application EP-A1-0 512 756 uses this principle to undertake geophysical prospecting and proposes to detect an acoustic wave induced by an electric field applied to a porous geological formation containing a fluid.

The drawback of these measurement processes is that the measured response signal is very weak, especially if it is an acoustic signal particularly in the case of rocks of high permeability for example above a few milli-Darcy. It means that in many cases, the limit of sensitivity of the measurement devices has been reached. It would be necessary to apply very substantial excitation signals to be able to hope to measure a more substantial response signal.

DISCLOSURE OF THE INVENTION

The present invention aims to overcome the drawback mentioned above. It proposes to increase the coupling between the excitation signal whether mechanical or electromagnetic and the measured response signal whether electromagnetic or mechanical respectively, this measured signal resulting from the conversion of the excitation signal in the formation fluid and expressing the formation response. In this way, it is possible to evaluate with greater resolution the properties of the rock medium, such as its permeability and/or its porosity or those of the fluid or fluids it contains.

In furtherance thereto the present invention is a process of geophysical prospecting of a porous geological formation containing at least one electrolytic fluid, comprising the following steps:

stimulation of a region of interest of the formation where the electrolytic fluid is found with an excitation signal corresponding to an energy of a first type, in such a way that the excitation signal is converted in the region of interest into a response signal corresponding to an energy of a second type and detection of a response signal. It additionally comprises a step of electric polarisation of the region of interest so as to strengthen the response signal relative to what it would be in the absence of polarisation.

The first type energy may be mechanical energy or electromagnetic energy, the second type energy then being electromagnetic energy or mechanical energy respectively.

The region of interest is the seat of an impedance break. This impedance break may correspond to an interface between two fluids at least one of which is electrolytic, to an interface between two different rock media of the formation or to a formation fracture.

Electric polarisation may come about by means of a continuous or quasi-continuous polarising electric field.

When the polarising electric field is quasi-continuous, it is preferable for it to be modulated in frequency with a frequency which is low in front of the excitation signal frequency.

Electric polarisation may be obtained by means of several electrodes connected to power supply means.

In another embodiment, electric polarisation is obtained by means of at least two coils connected to power supply means.

The present invention also relates to a device for geophysical prospecting of a porous geological formation containing at least one electrolytic fluid, comprising in a well:

an excitation device to stimulate a region of interest of the formation where the electrolytic fluid is found with an excitation signal corresponding to an energy of a first type, in such a way that the excitation signal is converted in the region of interest into a response signal corresponding to an energy of a second type, a response signal detection device, and additionally a polarisation device to polarise the region of interest electrically, so as to strengthen the response signal relative to what it would be in the absence of polarisation.

BRIEF DESCRIPTION OF THE DRAWINGS

The present invention will be better understood from reading the description of embodiment examples given, purely as an indication and in no way restrictively, with reference to the appended drawings in which.

In these figures, identical elements are denoted by the same reference characters.

DETAILED DISCLOSURE OF PARTICULAR EMBODIMENTS

Figure 1:
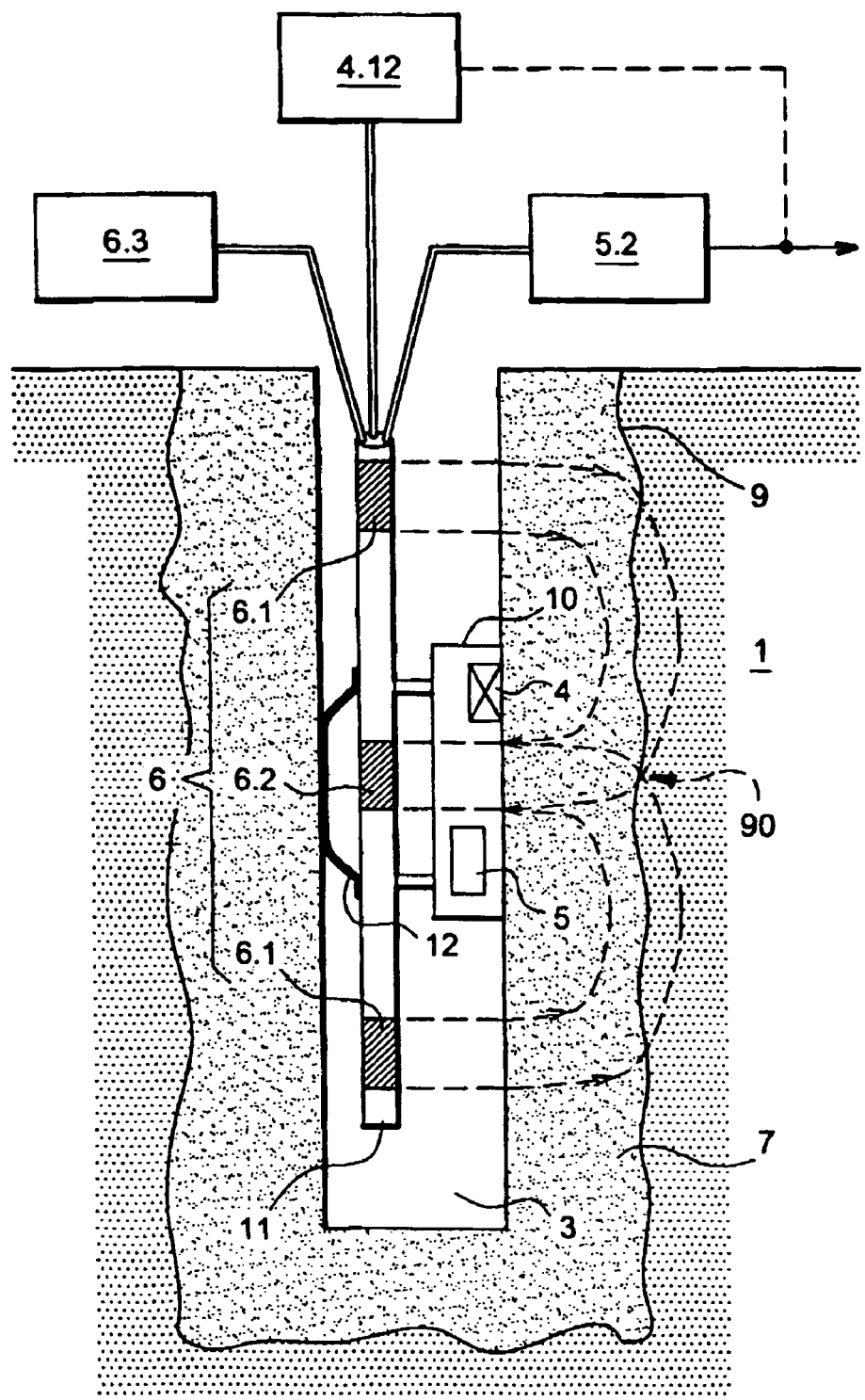
FIG. 1 shows a device example used to implement the process according to the invention.

Reference is made to FIG. 1 which shows a device for implementing the process according to the invention. In this figure can be seen a porous geological formation 1 whose fluid saturated pores (not shown) contain at least one electrolytic fluid. This electrolytic fluid may be water, salt or fresh, a hydrocarbon such as oil or gas, or a mixture of one or more of these fluids.

A well 3 is drilled in the formation 1, around the well 3 is found a zone 7 flooded with drilling sludge. Further away from the well 1, is found the non-attacked rock of the porous geological formation 1 with the electrolytic fluid. The zone 7 flooded with drilling sludge is from a few centimetres to some tens of centimetres thick. The zone 7 does not have the same impedance as the undamaged rock of the porous geological formation 1 and the interface 9 separating the drilling sludge from the undamaged rock corresponds to an impedance break.

The geophysical prospecting which is the subject of the invention will be carried out in a region of interest 90 of the rock formation 1 and it is pre-supposed that the region of interest 90 includes the interface 9. Another region of interest could be chosen, at the interface between two fluids contained in the formation, at the level of a fracture in the rock formation or at the boundary between two rocks of different kinds, for example. The advantage of this interface 9 is that its position is approximately known when the well was drilled 3 and that it will not be too difficult to excite it at points. It is also pre-supposed that the geological formation 1 is saturated in fluid in the region of interest 90.

Generally speaking, it is preferable for the region of interest to contain an impedance break since at the level of an impedance break the phenomena it is wished to detect are amplified.

Into this well 3 are lowered an excitation device 4, a measurement device 5 and a polarisation device 6, these devices are connected to the surface. The excitation device 4, the measurement device 5 and the polarisation device 6 are placed in proximity to the region of interest 90.

The excitation device 4 and the measurement device 5 may be of the same kinds as those described in the European patent EP-B-0 043 768 previously mentioned.

In a shoe 10 adapted to come into contact with the inner surface of the well 3 are found the excitation device 4 and the measurement device 5. The shoe 10 is mounted on an elongated support 11, for example a diagraphy tool, connected electrically and mechanically to the surface, this support 11 being fitted with resilient means 12, for example of the leaf-spring type, in order to apply the shoe 10 firmly against the inner surface of the well 3.

Figure 2:
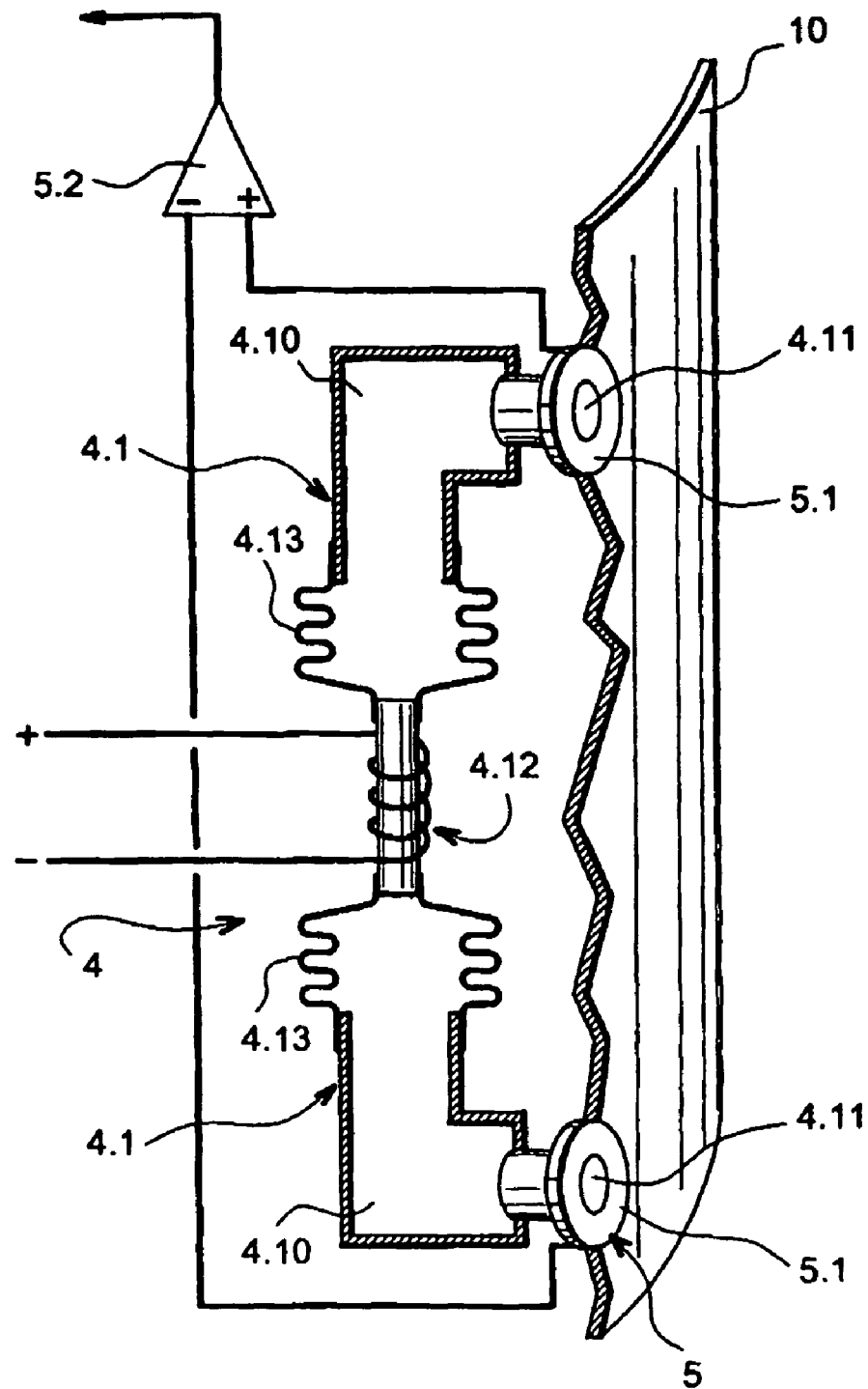
FIG. 2 shows an excitation device and measurement device example mounted in a shoe to be applied against the inner surface of the well to carry out the prospecting.

FIG. 2 shows an embodiment of the excitation device 4 and of the measurement device 5 mounted in the shoe 10.

The excitation device 4 is of the mechanical type and comprises at least one pressure generator 4.1 consisting of a fluid reservoir 4.10 fitted with a small opening 4.11 and with a bellows device 4.13 for discharging the fluid from the reservoir through the small opening 4.11. The fluid may be for example water. When the shoe 10 is supported against the inner surface of the well 3, the openings 4.11 are in contact with said surface. The pressure generator 4.1 may be pulse driven by a source of electrical energy 4.12 able to be controlled from the surface.

The measurement device 5 is of the electrical type and comprises a plurality of electrodes 5.1 mounted on the shoe 10 and connected electrically by appropriate conductors to a measurement processing circuit 5.2 generally placed on the surface. In this example, there are two pressure generators 4.1 and an electrode 5.1 surrounds each of the openings 4.11. The electrodes 5.1 are electrically isolated one from another. The measurement processing circuit 5.2 may include an operational amplifier, the signal it delivers corresponding to the difference in flow potentials at electrode level. It is from this signal and from the applied pressure that it is going to be possible to evaluate the properties of the rock medium and/or of the fluid or fluids brought into operation.

The polarisation device 6, distinct from the excitation device 4 and from the measurement device 5, is mounted on the support 11 and comprises, in this example, a set of electrodes 61, 6.2 on the surface of the support 11. These electrodes 61, 6.2 appropriately spaced apart from each other are connected electrically to power supply means 6.3, generally placed on the surface, to polarise electrically the region of interest 90 of the geological formation 1 for prospecting, by applying to it a continuous or quasi-continuous electric field. The electrodes 61, 6.2 are isolated electrically from the support 11 which carries them. They do not need to be in contact with the inner surface of the well 3. They may be made of aluminium, graphite or any other non-polarisable material.

In the example described have been shown three electrodes distributed approximately along the support 11 which is elongated, the two end electrodes 6.1 are positively polarised whereas the central electrode 6.2 is negatively polarised. The polarising electric field which is established in the formation at the level of the region of interest 90 is shown by the dotted line arrows. At the depth of the central electrode 6.2, the resulting electric field converges towards the central electrode 6.2, the effect of which is to drive the free ions of the fluid, which are pre-supposed negative, in the opposite direction, in other words towards the right. The positive ions following the direction of the electric field cluster at the surface of rock parts of the geological formation 1.

The fact of using a number of electrodes strictly greater than two and an odd number makes it possible to be able to adjust the polarising electric field by concentrating it in the region of interest 90. Other distributions of electrodes are of course possible.

In operation, the shoe 10 is applied against the inner surface of the well 3, the polarising electric field is applied in the region of interest by means of the electrodes 6.1, 6.2 of the polarisation device 6, the pressure generator 4.1 is activated to excite the geological formation 1 via pressure pulses and the values of the resulting flow potentials are detected by the electrodes 5.1 of the measurement device 5 so as to obtain the response of the geological formation 1 in the region of interest 90, at the level of the interface 9.

When polarising the region of interest 90 electrically with an appropriately directed electric field, fluid-ions are added at the surface of the rock parts relative to the number which naturally occur there, the quantity of free ions in the fluid found in the pores is therefore increased. When the pressure wave generated by the excitation device 4 reaches the interface 9 in the region of interest 90, the electric polarisation strengthens the reflection of the acoustic waves to the detriment of the transmission of the pressure waves beyond the interface. The electrical, so-called flow, current induced between the measurement device 5 and the interface 9 and therefore the coupling coefficient is then increased. The effect of the electric polarisation is to stretch the membrane of the drum to resume the colourful analogy mentioned above.

In a preferred embodiment, a frequency modulated polarising electric field is generated, this polarisation frequency being small relative to the excitation signal frequency. The signal to noise ratio may then be improved by selectively amplifying, in the signal measured by the measurement device 5, the part of the signal relating to coupling and which is in phase with the excitation frequency and that relating to polarisation and which is at the polarisation frequency.

The advantage of this modulation is that it prevents the polarisation of the electrodes 6.1, 6.2 themselves. This polarisation of the electrodes 6.1, 6.2, if it were to take place, would be expressed by an accumulation of ions at their surface, which would have the drawback of attacking them, or causing in their environment chemical transfers which would partially or totally inhibit their sensitivity. Another advantage of this modulation is that it is free of the polarity of the rock medium. Indeed, if no samples are taken in the region of interest 9, it is not clear a priori what the polarity of its natural surface charge is. It is unclear therefore how to direct the polarising electric field. With frequency modulation the polarising electric field is correctly directed at one moment or at another.

As an example an electric field will be chosen whose strength may take a value of more or less 220 volts with a frequency of 1 Hertz if the excitation signal has a frequency of 50 Hertz.

Instead of polarising from electrodes, it is possible to do it inductively from several coils. The coils induce magnetic fields in the formation and these magnetic fields induce movements of charges therefore electric fields. One difference relative to electrodes is that coils are always supplied with alternating current and the induced electric field is always alternating. Another advantage of coils is that there is greater freedom in positioning them, which allows more latitude in adjusting the polarising electric field in the region of interest 90.

Figure 3A:
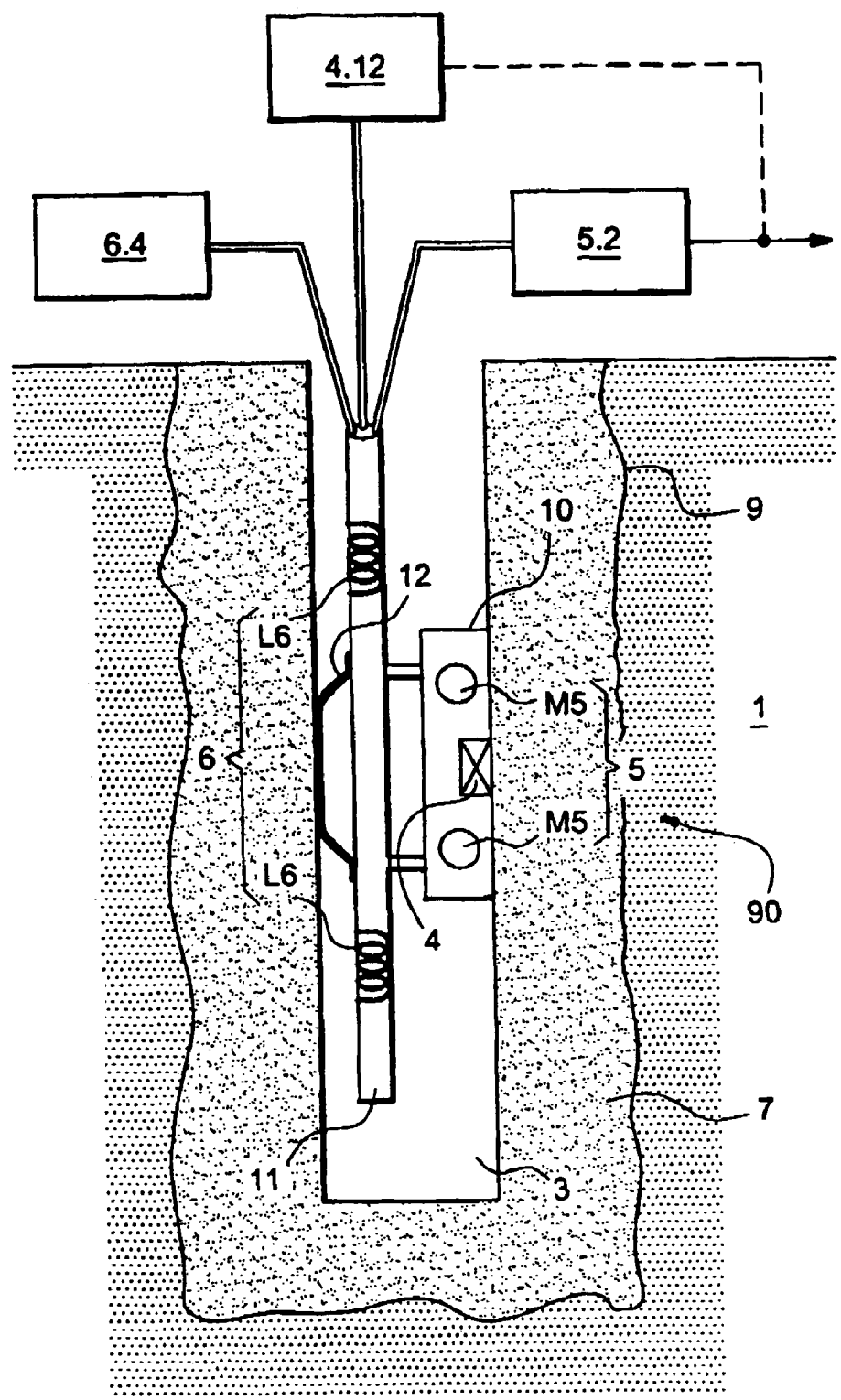
FIGS. 3A, 3B show two other examples of devices for implementing the process according to the invention.
Figure 3B:
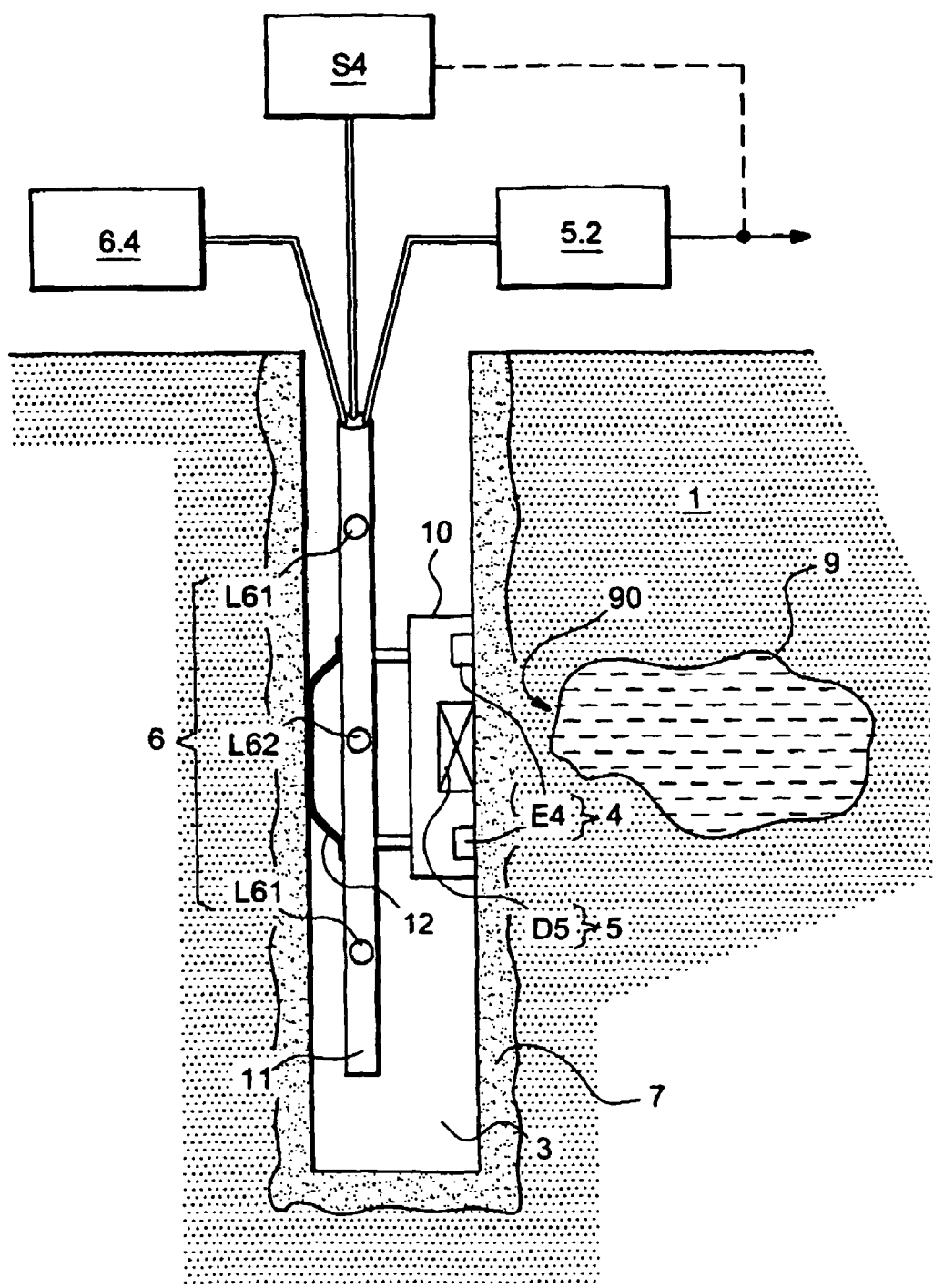

Reference may be made to FIGS. 3A, 3B which show two possible configurations of coils, these configurations may of course be combined.

In FIG. 3A, the polarisation device 6 comprises two coils L6 the turns of which are rolled around the support 11 in the form of a rod lowered into the well 3. The axis of coiling of their turns is approximately parallel to the axis of the support 11, in other words to the axis of the well 3. These coils L6 are connected electrically to power supply means 6.4 placed on the surface. By adjusting the electric current which passes through them, it is possible to adjust, in strength and direction, the polarising electric field which is established in the region of interest 90.

There is another difference in this FIG. 3A relative to FIG. 1, to be found at the level of the measurement device 5. Instead of measuring an electric field by means of a measurement of potential, the measurement device 5 measures a magnetic field and comprises two magnetometers M5 shown in the form of coils. These magnetometers M5 are connected electrically to a measurement processing circuit 5.2 placed on the surface. It is pre-supposed that there is no change at the level of the excitation device 4.

In FIG. 3B, the axis of coiling of the turns of the coils L61, L62 is now approximately transverse to the axis of the support 11, in other words to the axis of the well 3. Three coils L61, L62 have been shown along the support 11. These coils L61, L62 are connected electrically to power supply means 6.4 located on the surface. In this example, the turns of the two end coils L61 would be wound in the same direction and those of the central coil L62 would be wound in the reverse direction.

The embodiment in FIG. 3B shows at least one other difference relative to that in FIG. 1. Now the excitation device 4, instead of being mechanical, is electromagnetic and the measurement device 5, instead of being electromagnetic, is mechanical. It is pre-supposed that the excitation device 4 consists of at least one pair of electrodes E4 between which, an alternating current or a pulsed direct current is passed. The electrodes E4 are connected on the surface to power supply means S4, they are applied against the inner surface of the well 3.

The measurement device 5 may include one or more seismic detectors D5 of the geophone or hydrophone type for example. These seismic detectors D5 are connected on the surface to a measurement processing circuit 5.2.

It is now pre-supposed that the region of interest 90 contains an interface 9 between two fluids, between two different rock media or a fracture zone in the rock medium.

Although a number of embodiments of the present invention have been shown and described in detail, it will be understood that different changes and modifications may be made without departing from the framework of the invention. It is in particular possible to modify the location of the measurement device and the excitation device. One of them at least could for example be on the surface or in proximity to the surface. It would also be conceivable for one of them at least to be located in a well different from the one containing the polarisation device.

The invention claimed is:

1. A process of geophysical prospecting of a porous geological formation containing at least one electrolytic fluid based on electro-kinetic or electro-osmotic coupling effects, comprising the steps of:
stimulating a region of interest of the formation where the at least one electrolytic fluid is found with an excitation signal corresponding to an energy of a first type in such a way that the excitation signal is converted in the region of interest into a response signal corresponding to an energy of a second type,
detecting of the response signal,
applying an electric polarisation to the region of interest so as to strengthen the response signal relative to what it would be in the absence of the electric polarisation of the region of interest,
wherein the electric polarisation comes about by means of a continuous or quasi-continuous polarising electric field, the excitation signal has an excitation frequency, and the polarising electric field is modulated in frequency with a frequency which is low relatively to the excitation frequency.

2. The process according to claim 1, wherein the first type energy is mechanical energy or electromagnetic energy, the second type energy being electromagnetic energy or mechanical energy respectively.

3. The process according to claim 1, wherein the region of interest contains an impedance break.

4. The process according to claim 3, wherein the impedance break corresponds to an interface between two fluids at least one of which is electrolytic, to an interface between two different rock media of the formation or to a formation fracture.

5. The process according to claim 1, wherein the electric polarisation is obtained by means of several electrodes connected to power supply means.

6. The process according to claim 1, wherein the electric polarisation is obtained by means of at least two coils connected to power supply means.

7. A device for geophysical prospecting of a porous geological formation containing at least one electrolytic fluid, comprising in a well:
an excitation device to stimulate a region of interest of the formation where the at least one electrolytic fluid is found with an excitation signal corresponding to an energy of a first type, in such a way that the excitation signal is converted in the region of interest into a response signal corresponding to an energy of a second type, a response signal detection device, a polarisation device to apply an electric polarisation to the region of interest, so as to strengthen the response signal relative to what it would be in the absence of the electric polarisation of the region of interest, wherein the polarisation device induces a continuous or quasi-continuous polarising electric field, the excitation signal has an excitation frequency and the continuous or quasi-continuous polarising electric field has a frequency which is low relatively to the excitation frequency.

8. The device according to claim 7, wherein the polarisation device comprises several electrodes.

9. The device according to claim 7, wherein the polarisation device comprises at least two coils.

10. The device according to claim 9, wherein the coils have an axis approximately parallel to that of the well.

11. The device according to claim 9, wherein the coils have an axis approximately transverse to that of the well.

12. The device according to claim 7, wherein the region of interest contains an impedance break.

13. The device according to claim 12, wherein the impedance break corresponds to an interface between two fluids at least one of which is electrolytic, to an interface between two different rock media of the formation or to a formation fracture.

* * * * *